US011130704B2

(12) United States Patent
Guedon et al.

(10) Patent No.: US 11,130,704 B2
(45) Date of Patent: Sep. 28, 2021

(54) GLASS-CERAMIC GLASS ARTICLE AND METHOD FOR OBTAINING SAME

(71) Applicant: EUROKERA S.N.C., Chateau Thierry (FR)

(72) Inventors: Thibault Guedon, Paris (FR); Clement Pasquinet, Saint-Vallier (FR)

(73) Assignee: EUROKERA S.N.C., Chateau Thierry (FR)

( * ) Notice: Subject to any disclaimer, the term of this patent is extended or adjusted under 35 U.S.C. 154(b) by 258 days.

(21) Appl. No.: 16/306,973

(22) PCT Filed: Jun. 15, 2017

(86) PCT No.: PCT/FR2017/051547
§ 371 (c)(1),
(2) Date: Dec. 4, 2018

(87) PCT Pub. No.: WO2017/216487
PCT Pub. Date: Dec. 21, 2017

(65) Prior Publication Data
US 2020/0048144 A1 Feb. 13, 2020

(30) Foreign Application Priority Data
Jun. 17, 2016 (FR) ...................... 1655634

(51) Int. Cl.
*B32B 15/04* (2006.01)
*C03C 17/34* (2006.01)
*C03C 3/087* (2006.01)
*C03C 10/00* (2006.01)
*F24C 15/04* (2006.01)
*F24C 15/10* (2006.01)

(52) U.S. Cl.
CPC .............. *C03C 17/34* (2013.01); *C03C 3/087* (2013.01); *C03C 10/0009* (2013.01); *C03C 2217/485* (2013.01); *C03C 2218/36* (2013.01); *F24C 15/04* (2013.01); *F24C 15/10* (2013.01)

(58) Field of Classification Search
CPC .............. F24C 15/10; C03C 2217/485; C03C 2218/36; C03C 17/34; C03C 10/0009
USPC .......... 428/426, 428, 432, 701, 702
See application file for complete search history.

(56) References Cited

U.S. PATENT DOCUMENTS

| | | | | |
|---|---|---|---|---|
| 9,006,620 B2* | 4/2015 | Vilato | ...................... | C03C 17/00 219/622 |
| 10,154,544 B2* | 12/2018 | Dufour | ................. | C03C 17/007 |
| 2005/0214521 A1* | 9/2005 | Florent | ................. | C03C 17/007 428/323 |
| 2005/0224491 A1* | 10/2005 | Vilato | ..................... | C03C 17/04 219/443.1 |
| 2008/0035896 A1* | 2/2008 | Striegler | ............. | C03C 10/0027 252/520.3 |
| 2008/0190409 A1* | 8/2008 | Demol | ..................... | H05B 3/74 126/211 |
| 2009/0233082 A1* | 9/2009 | Esemann | ............... | C03C 17/007 428/319.1 |
| 2009/0305032 A1* | 12/2009 | Striegler | ................. | C09D 1/00 428/336 |
| 2010/0089905 A1* | 4/2010 | Nelson | ..................... | H05B 3/74 219/452.11 |
| 2010/0167035 A1* | 7/2010 | Striegler | ............. | C03C 17/3405 428/216 |
| 2010/0219176 A1* | 9/2010 | Striegler | ................. | C03C 17/02 219/443.1 |
| 2010/0301035 A1* | 12/2010 | Vilato | ................. | C03C 17/3411 219/443.1 |
| 2012/0295081 A1* | 11/2012 | Henze | ..................... | C03C 1/008 428/201 |
| 2013/0266781 A1* | 10/2013 | Hoffmann | ............... | F24C 15/10 428/204 |
| 2014/0146538 A1* | 5/2014 | Zenker | ..................... | G09F 9/33 362/293 |
| 2015/0024145 A1* | 1/2015 | Bockmeyer | ............. | C03C 1/008 427/558 |
| 2015/0037507 A1* | 2/2015 | Bockmeyer | ............. | C03C 17/32 427/407.2 |
| 2015/0210871 A1* | 7/2015 | Anton | .................. | C09D 11/102 524/430 |
| 2015/0267079 A1* | 9/2015 | Bockmeyer | ............. | C03C 1/008 428/336 |
| 2016/0169531 A1* | 6/2016 | Wagner | .................. | B32B 5/142 428/172 |

(Continued)

FOREIGN PATENT DOCUMENTS

DE  10 2012 109 808 A1  6/2014
EP     2 796 432 A1     10/2014

OTHER PUBLICATIONS

International Search Report dated Aug. 8, 2017 in PCT/FR2017/051547 filed Jun. 15, 2017.

*Primary Examiner* — Lauren R Colgan
(74) *Attorney, Agent, or Firm* — Element IP, PLC

(57) ABSTRACT

A glass, in particular glass-ceramic, article, which is intended in particular to be used with at least one heating element, is formed of at least one substrate, such as a glass-ceramic plate. The substrate is at least partly coated with at least one layer of ink, which is advantageously deposited by inkjet printing. The ink is formed of nanoscale pigments and of at least one silicone binder. The layer of ink is coated with at least one layer of silicone-based paint. The layer of paint advantageously is deposited in the form of a flat tint, in particular by screen printing, and preferably being opacifying.

20 Claims, No Drawings

(56) References Cited

U.S. PATENT DOCUMENTS

| | | | |
|---|---|---|---|
| 2016/0252656 A1* | 9/2016 | Waldschmidt | H04L 63/123 |
| | | | 362/259 |
| 2016/0258631 A1* | 9/2016 | Aihara | C03C 17/44 |
| 2017/0020331 A1* | 1/2017 | Berrux | C09D 183/10 |
| 2017/0247289 A1* | 8/2017 | Waldschmidt | B23K 26/57 |

* cited by examiner

GLASS-CERAMIC GLASS ARTICLE AND METHOD FOR OBTAINING SAME

The present invention relates to a glass article, in particular a glass-ceramic article, intended, for example, for covering or receiving heating elements (such as a cooktop, an oven door, a fireplace insert, or a fire screen, etc.), and to a process for obtaining said article. The expression "glass article", respectively "glass-ceramic article", is understood to mean an article based on a substrate made of glass material, respectively made of glass-ceramic, said substrate being, where appropriate, provided with additional (decorative or functional) accessories or elements required for the final use thereof, it being possible for the article to denote both the substrate alone and the substrate provided with additional equipment (for example a cooktop provided with its control panel, its heating elements, etc.). A "glass-ceramic" glass article is understood to mean, in addition to the glass-ceramics mainly targeted, any other glass material having a coefficient of expansion, or CTE, measured according to the standard ISO 7991:1987, of less than $50 \times 10^{-7}$ $K^{-1}$ between 20° C. and 300° C., it being possible, where appropriate, for said material to replace the glass-ceramic in applications where the material is combined with heating elements, such as the production of cooktops.

There are several glass-ceramic products in common use, in particular glass-ceramic cooktops are very successful among household appliance vendors, household electric appliance manufacturers and users. This success is explained in particular by the attractive appearance of these plates and by the ease of cleaning them.

A glass-ceramic is originally a glass, referred to as precursor glass (or mother glass or green glass), the specific chemical composition of which allows controlled crystallization to be induced by suitable heat treatments, referred to as ceramization treatments. This partly crystallized specific structure gives the glass-ceramic unique properties.

At the present time, there are various types of glass-ceramic plates, each variant being the result of specific studies and many tests, given that it is very difficult to make modifications to these plates and/or to the process for obtaining them without risking an unfavorable effect on the desired properties. In particular, to be able to be used as a cooktop, a glass-ceramic plate must generally have a transmission in the wavelengths of the visible range that is both low enough to mask at least some of the underlying heating elements when not in use and high enough so that, depending on the case (radiant heating, induction heating, etc.), the user can, for the sake of safety, visually detect the heating elements when they are turned on and/or can, where appropriate, read the displays. It must also have a high transmission in the wavelengths of the infrared range, in particular in the case of plates with radiant burners. The glass-ceramic plates must also have a sufficient mechanical strength as demanded in their field of use. In particular, in order to be able to be used as cooktops in the field of household electrical appliances, the glass-ceramic plates must have a good ability (as defined for example in accordance with the EN 60335-2-6 standard), to withstand pressure and impacts (support and dropping of utensils, etc.), etc.

The most common cooktops are of dark color, in particular of black color, but there are also cooktops of lighter appearance (in particular of white color having, for example, a haze of at least 50%, as described in patent FR 2 766 816), or even transparent cooktops provided with opacifying coatings.

Among the known (functional and/or decorative) coatings for glass-ceramic plates, there are conventionally enamels, based on glass frit and pigments. In particular, enamels have the advantage of being able to be deposited on the precursor glass (or mother glass or green glass) before ceramization and of being able to be fired during the ceramization, and also have the advantage of being able to withstand high temperatures (thus allowing the use of various heating means for the plate). However, they may locally decrease the mechanical strength of the glass-ceramic plates and may flake off, in particular for thick deposits or deposits made in several passes, certain colors additionally not being achievable or being difficult to obtain (in particular in a single pass), the firing of the enamels possibly also giving rise to the appearance of undesired hues (for example browns or grays for black enamels).

It is also known to use certain paints that withstand high temperature, the use thereof nevertheless remaining more limited than that of enamels, due to their lower resistance, in particular thermal resistance and abrasion resistance.

Coatings are generally deposited on glass-ceramic by screen printing, the decoration generally being limited to one or a few colors, each color generally requiring one screen-printing pass, and the designs generally being limited to simple shapes (circles, dots, flat tints, etc.). This method nevertheless involves changing the screen printing screen as soon as the decoration of the plate changes, and also makes it necessary to store all the screens necessary for the printing of the various models of glass-ceramic plates.

There are also other coating techniques developed for the decoration of supports of different nature and that enable more varied decorations, for example digital printing techniques such as inkjet printing, these techniques generally being is easier to carry out. Nevertheless, the inks developed to date for inkjet printing are either suitable for decorating porous substrates (paper, plastic) and do not withstand high temperatures well, their adhesion to other types of substrates, such as glass substrates, furthermore being insufficient, or are ceramic inks (that can also be considered as enamels), formed of glass frits that are intended to melt during the firing in order to form a glassy matrix, and of pigments, these inks being more suitable for the deposition on glass materials subjected to high temperature but at the same time having (like all enamels) the drawback of weakening the glass materials on which they are deposited.

Although the deposition of these ceramic or enamel inks by jet printing has been attempted on glass and has been satisfactory for the decoration of architectural glass where the decoration is under little mechanical and thermal stress, on the other hand the compositions developed and these techniques have proven to date to not be very suitable for the decoration of plates subjected to high temperature such as glass-ceramic cooktops or cooktops made of strengthened glass having a CTE of less than $50 \times 10^{-7}$ $K^{-1}$ between 20° C. and 300° C., the coatings obtained not meeting the customary requirements (as regards mechanical strength, soiling behavior, abrasion resistance under operating conditions, etc.) of cooktops.

Currently, there is therefore no technique that makes it possible to easily and economically decorate glass-ceramic cooktops, or cooktops made of glass material having a CTE of less than $50 \times 10^{-7}$ $K^{-1}$ between 20° C. and 300° C., while complying with the constraints, in particular thermal and mechanical constraints, specific to this application, and while offering great flexibility and numerous variations of possible decorations.

The objective of the present invention was therefore to provide novel glass articles, in particular glass-ceramic articles, in particular novel plates (of glass-ceramic type) intended to be used with one or more heating elements, in particular intended for covering or receiving heating elements such as cooktops, widening the range of existing products and having a great variety of decorations, these decorations being obtained easily and economically, while retaining properties, in particular thermal and mechanical properties, for the decorated article as are desired in the targeted applications.

This objective was achieved by the article developed according to the invention and by means of the advantageous process for obtaining said article.

The present invention thus relates to a novel glass, in particular glass-ceramic, article (or product) formed of at least one substrate (or support) made of glass material (in particular made of glass-ceramic), such as a plate (in particular glass-ceramic plate), said substrate being at least partly coated (at the surface, on at least one portion of one face, preferably the lower face in the case of a cooktop) with at least one layer of ink, advantageously deposited by inkjet printing, this ink being (initially) formed of (or being based on, or comprising, or being formed from) nanoscale pigments and at least one silicone binder (based on or formed of silicone (resin(s) or polymer(s)), the ink preferentially comprising, as binder(s), only one or some silicone binders), said layer of ink being coated with at least one layer of paint based on (or comprising, or being formed of or from) silicone, this layer of paint advantageously being deposited in the form of a flat tint or a uniform layer, in particular by screen printing, and preferably being opacifying.

The present invention also relates to a process for manufacturing a glass (in particular glass-ceramic) article according to the invention, formed of at least one substrate made of glass material (in particular made of glass-ceramic), wherein at least one layer of ink formed of nanoscale pigments and of at least one silicone binder is applied, advantageously by inkjet printing, on at least one portion of said substrate, and wherein at least one layer of silicone-based paint is applied on said layer of ink, in particular in the form of a flat tint (or uniform layer), the coated substrate optionally being dried (in the open air where appropriate or by treatment, for example heat treatment) and/or fired.

In the present invention, the article is thus provided with at least one decorative and/or functional coating, in the form of a superposition of at least two layers or types of layers (multilayer coating), including at least one layer of ink (first layer or first type of layer) formed of nanoscale pigments and of a silicone binder, and at least one (other) layer (second layer or type of layer, "first" and "second" denoting a relative order in that one of the layers—the first—is comparatively closer to the substrate than the second or is deposited before the second) of silicone paint, the first layer advantageously being deposited by inkjet printing and making it possible in particular to produce the desired decoration or design, and the second layer being deposited so as to cover the first (in particular completely, and possibly covering the entire face bearing the multilayer coating) and in particular protecting the first layer, and also advantageously serving as opacifier, this second layer in particular being deposited by screen printing.

The ink selected is mainly (to at least 50% by weight, preferably at least 80% in the final ink layer) formed of nanoscale pigments and of silicone binder(s) (it being possible for the initial ink to also contain solvents, subsequently eliminated by drying or firing, and/or it being possible for the ink to further contain a low content of additives and/or fillers), this ink, unlike ceramic inks, advantageously being free of glass frit. It is advantageously deposited by inkjet printing and forms a layer, in particular several microns thick, on the glass-ceramic glass substrate, this layer generally being non-opaque (transparent or translucent). It can be observed that the layer of ink thus selected, and in the configuration of the invention combining the two layers, has a good adhesion to the glass-ceramic glass material, without even requiring firing following the deposition thereof, nor requiring the prior deposition of an adhesion primer, and does not mechanically weaken the glass-ceramic glass substrate (unlike in particular an enamel), while the selected paint serves as thermal protection and advantageously as opacifier (where appropriate hiding the elements covered by the plate such as the heating systems, when not in use, while enabling them to be seen where appropriate when they are turned on), the use of one or other of these layers alone not, on the other hand, being satisfactory for obtaining an article as desired according to the invention.

The specific ink and specific paint assembly chosen also makes it possible to combine the advantages of two types of different depositions, in particular by choosing inkjet printing for the first type of layer, to be able to provide the article with various designs in high resolution (of photographic type), on small runs where appropriate and while being able if necessary to personalize the printings individually without however requiring expensive equipment or complex equipment changes, and by choosing a more conventional deposition technique for the second type of layer, to be able to deposit a layer rapidly on a surface, where appropriate, that is larger (as a flat tint over the entire lower face for example), while retaining the properties, in particular the thermal resistance and the mechanical strength, that are required for articles of this type, in particular for the targeted applications. The article has, in particular, a good thermal resistance is (unlike what can be obtained for example with customary commercial inks used alone, in particular ultraviolet curable inks, which degrade during the firing of the coating), in particular when the ink used is a black ink (based on black pigments, in particular of carbon black type as indicated subsequently).

The present invention has thus developed a product and a coating technique for glass-ceramics or glass materials having a CTE of less than $50\times10^{-7}$ $K^{-1}$ between 20° C. and 300° C. that can be used to produce cooktops, making it possible to obtain a greater variety of decorations while complying with the constraints, in particular thermal and mechanical constraints, specific to the targeted preferred application (decorated plates subjected to high temperatures such as cooktops) and this being economically, simply and effectively while weakening the glass-ceramic material as little as possible, with color effects or renderings that are innovative or difficult to obtain to date, it being possible for these decorations to be functional (identification of zones, for example control display zones, etc.) and/or esthetic, the coating developed having a good resistance (in particular mechanical strength, thermal resistance and/or abrasion resistance) and a good durability on the coated article obtained.

Preferably, the substrate forming the article according to the invention (or the article itself if it is formed only of the substrate) is a plate, intended for example for covering or receiving at least one heating element, in particular intended for being used as a cooktop or as a wall (in particular door or door part) for an oven or fireplace insert or else fire screen.

The substrate is generally of geometric shape, in particular rectangular, or even square, or even circular or oval, etc. shape, and generally has an "upper" or "outer" face (face visible to or turned toward the user) in the position of use, another "lower" or "inner" face (generally hidden, for example in a framework or carcass of a piece of furniture) in the position of use, and an edge face (or edge or thickness). The upper face is generally flat and smooth but may also have at least one raised zone and/or at least one recessed zone and/or at least one opening and/or beveled edges (these shapes having been added during the manufacture of the substrate, for example by rolling or sag bending or pressing, etc., or having been added in off-line operations), etc., these variations in shape advantageously constituting continuous variations in the plate (without changing in materials or joins). The lower face is generally flat and smooth according to the present invention but could where appropriate also have structuring (for example studs).

The thickness of the glass, in particular glass-ceramic, substrate used is generally at least 2 mm, in particular at least 2.5 mm, in particular is of the order of 3 to 30 mm, and advantageously is less than 15 mm, in particular is of the order of 3 to 15 mm, in particular from 3 to 6 mm.

The substrate (respectively the article) is preferably made of glass-ceramic, which is resistant to high temperature, and which advantageously has a zero or quasi-zero CTE, in particular of less (as an absolute value) than $30 \times 10^{-7}$ $K^{-1}$ between 20° C. and 300° C., in particular less than $15 \times 10^{-7}$ $K^{-1}$, or even less than $5 \times 10^{-7}$ $K^{-1}$ between 20° C. and 300° C.

More generally, the present invention applies to a substrate (respectively an article) made of any glass material having a CTE (coefficient of expansion) of less (as an absolute value) than $50 \times 10^{-7}$ $K^{-1}$ between 20° C. and 300° C., whether it is a glass-ceramic (the CTE of which is advantageously less than $30 \times 10^{-7}$ $K^{-1}$), or any other glass material having a CTE of less than $50 \times 10^{-7}$ $K^{-1}$ between 20° C. and 300° C., for example a reinforced glass (in particular chemically or thermally tempered glass). The coefficient of thermal expansion, or CTE, is measured, between ambient temperature (in particular around 25° C.) and 300° C. (also referred to as $CTE_{300° C.}$), according to the standard ISO 7991:1987, using in particular a high-temperature dilatometer of reference DIL 402C sold by the company Netzsch, at a heating rate of 3° C./min.

Preferably, the substrate of the article according to the invention is formed of a glass material, in particular of a glass-ceramic, which is transparent, having in particular a light transmission $T_L$ (measured according to the standard ISO 9050:2003 using the illuminant D65, for example with the aid of a spectrophotometer equipped with an integrating sphere, the measurement at a given thickness then being converted where appropriate to the reference thickness of 4 mm, this total transmission, integrated into the visible range, taking into account the direct transmission and the possible diffuse transmission) of greater than 10%, preferably greater than 70%, in particular greater than 80%. In the case of a glass-ceramic, this transparent substrate generally comprises crystals of β-quartz structure within a residual glassy phase.

The glass-ceramic used may in particular have a composition as is described in the patent applications published under the following numbers: WO2013171288, US2010167903, WO2008065166, EP2086895, JP2010510951, EP2086896, WO2008065167, US2010099546, JP2010510952, EP0437228, WO2016038319, this glass-ceramic being in particular a lithium aluminosilicate glass-ceramic, this glass-ceramic being for example that of the plates sold under the name KeraLite by the companies Eurokera and Keraglass.

The glass-ceramic used may, where appropriate, comprise colorants that give particular colorations to the substrate, for example vanadium oxide, iron oxide, cobalt oxide, cerium oxide, selenium oxide, chromium oxide or even nickel oxide, copper oxide and/or manganese oxide, etc.

The glass-ceramic used may be refined with arsenic (i.e. having (a mother glass with) a composition comprising of the order of 0.2% to 1.5% by weight of arsenic oxide (expressed as $As_2O_3$)), or may be not refined with arsenic (in particular having a content of arsenic oxides of less than 0.2%, in particular of less than 0.1%, or even zero) or refined with tin or refined with sulfide(s) and may be obtained by a rolling process or by a float process.

Where appropriate, the glass material used may also be a non-ceramicized glass having a CTE of less than $50 \times 10^{-7}$ $K^{-1}$, in particular that is tempered, for example a tempered lithium aluminosilicate as described in the patent applications published under the following numbers: FR1060677, WO2012080672, or in the application filed in France under the number 1363157, or else a tempered glass of another type (soda-lime, borosilicate, etc.), for example as described in the application published under the number WO2012146860.

The first type of layer of the (final) coating, deposited or found on the substrate, may cover one or more zones of the surface of the substrate, this layer (and also the second layer deposited on this first layer, and the final coating formed of the two types of layers) being preferentially on the (or as) lower or inner face of the substrate, in particular when the latter is a plate intended in particular to be used as a cooktop. The first type of layer generally covers a portion only of the face of the substrate on which this type of layer is deposited (preferably the aforementioned lower or inner face) in order in particular to form the desired design(s), whereas the second type of layer generally covers virtually the whole (for example at least 90% of the surface) or the whole, not only of this first type of layer but also of this same face, in order for example to mask the elements that are found behind this face, in particular when the article is not operating/is not in use.

The first type of layer/the ink deposited is formed, in accordance with the invention, of nanoscale pigments and of at least one silicone binder. The term "ink" implies the presence of pigments and binder(s) or solvent(s), and also connotes a deposition mode such as inkjet printing in the present invention.

Nanoscale pigments or pigments of nanoscale size are understood to mean particles of (or that form these) pigments having a dimension or size of less than 100 nanometers, preferably less than 50 nm, irrespective of the shape of these particles.

The size of a particle refers to its equivalent diameter, i.e. the diameter of the sphere that would behave in an identical manner during the particle size analysis of the particles (or of the powder formed of said particles) that (initially) form the pigments in question, the particle size distribution (set of particle sizes) being measured in particular by laser particle size analysis. Advantageously, at least 50%, and preferably at least 90%, of the pigments present in the ink used in the present invention have a size of less than 100 nm (the size distribution is then evaluated using the D50 percentile, meaning that 50% of the particles of the set of particles considered (or of the powder considered) have a size of less than D50, or by respectively using the D90 percentile, meaning that 90% of the particles of the set of particles considered have a size of less than D90), and preferably of less than 50 nm, and particularly preferably all the pigments of the ink have a nanoscale size.

The first type of layer/the ink deposited is advantageously formed of at least 5%, preferably at least 10%, by weight of nanoscale pigments (in the final ink layer), the pigment content preferentially not exceeding 50% by weight in the composition of the ink (in the final ink layer, once dry).

The pigments used for producing the ink layer may be mineral or organic, and preferably withstand heat. For example, it is possible to use carbon black, to phthalocyanine, lithol rubine or diarylide pigments, or else pigments based on metal oxides, such as chromium oxides, copper oxides, iron oxides, cobalt oxides, nickel oxides, zinc oxides, manganese oxides, cerium oxides, titanium oxides, etc., or pigments based on chromates of copper or cobalt, etc. Preferably, use is made of black pigments of carbon black type.

The pigments are in particular dissolved or dispersed in the aforementioned silicone binder. A silicone binder is understood to mean a binder (or a composition acting as binder, i.e. used for coating the pigment powder and enabling the bulk agglomeration of the particles after drying or curing in order to form the solid ink layer) mainly (i.e. in a proportion of at least 50%, or even 100% by weight of the solids content) formed of silicone(s) (or polysiloxanes) ((polymer, monomer, oligomer) resin(s)) where appropriate in a solvent (forming part of the silicone binder and/or forming part of the ink). As solvent (of the binder and/or in the ink), use may be made, for example, of an alcohol-based solvent such as ethanol, methanol or glycerol, methyl ethyl ketone, ethyl acetate, dimethylformamide, methoxypropanol or ethoxypropanol, or even water, etc., ethanol in particular enabling a rapid drying (and being used where appropriate with a cosolvent such as glycerol or dimethylformamide or methoxypropanol), the content of solvent in the ink during the deposition generally being of the order of 50% to 80% by weight of the composition, the solvent then being eliminated in order to obtain the final layer (this elimination taking place predominantly during the drying for the ink according to the invention). The ink may comprise, where appropriate, binder(s) or resin(s) other than the silicone binder(s) (or resin(s)) (for example based on polyester or epoxy resin(s)), but preferably predominantly comprises, even as sole binder(s) or resin(s), one or more silicone binders or resin(s), at contents for example of 50% to 95% by weight of the ink (in the final ink layer).

Where appropriate, the ink may also include other types of components, in particular one or more additives (such as plasticizer(s), wetting agent(s), stabilizer(s), dispersant(s), surfactant(s), pH or viscosity adjuster(s), agents that slow down the evaporation, conductors, biocide(s), antifoam(s), antioxidant(s), etc.), or one or more mineral fillers (other than pigments and that do not melt in particular during the firing unlike frits, these fillers having for example a reinforcing role or a role of limiting the appearance of cracks in the layer, for example being formed of calcium and/or magnesium carbonates, barium sulfate, silica or silicates, etc.), at contents that preferentially do not exceed 20% by weight (in the final ink layer), the components in solid form also preferentially being in the form of nanoparticles.

The inks used are in particular and advantageously inks of NanoColours Ink jet reference sold by the company MuchColours.

Preferentially, the viscosity during the deposition of the inks used is between 1 and 100 mPa·s, in particular from 1 to 50 mPa·s. Also advantageously, the surface tension of the ink is between 20 and 50 mN/m.

The ink selected according to the invention thermally withstand the temperatures to which the zones in question of the articles according to the invention are subjected and are also lightfast.

As indicated above, the deposition of the ink in order to form the first type of layer is advantageously carried out by inkjet printing. The inkjet printing technique enables (advantageously under computer control) a direct, contactless deposition, with only the amount of ink needed, on the substrate according to the invention. In this technique, the liquid ink pulsed through one or more capillary orifices is separated into droplets, each microdrop being, where appropriate, projected and/or deflected, electrically or magnetically, during the projection thereof toward the printing support. The printed image is thus formed of a large number of small juxtaposed ink spots. The printing can be carried out continuously or as a jet on demand and enables effective and rapid deposition and drying, the thickness of the final ink layer, formed by the drops, preferably being between 0.1 μm and 10 μm in the present invention, in particular between 1 and 5 μm.

By extension, a layer of ink is understood to mean that the layer may be formed of one or more inks (each advantageously meeting the definition of the ink according to the invention, i.e. being based on nanoscale pigments and silicone binder), where appropriate mixed and/or superposed, simultaneously (simultaneous depositions during one and the same inkjet printer pass) and/or consecutively (several printer passes). In particular, several inks of primary colors may be superposed to form the layer advantageously printed (or applied) by inkjet printing (or obtained by inkjet printing).

The adjustment of the colors by superposition or mixing of inks in order to obtain the ink layer, in particular by inkjet printing, is particularly simple and precise. The color is for example defined by a ratio between various colors, including generally elementary or primary colors (such as cyan, magenta and yellow), in particular by a ratio between cyan, magenta, yellow and black, and is advantageously obtained by superposition of the depositions (of the inks) of each of the colors in the accepted ratios (or proportions). It is thus not necessary to prepare a solution with the correct ratios beforehand; the ratios are for example simply entered into the management software of the printer at the time of printing. They may therefore be adjusted very easily as a function of the batches of substrates used and of the desired decorations. Inkjet application also makes it possible to avoid the thickness inhomogeneity problems observed for example with screen printing, and to obtain a good uniformity of the resulting color.

The ink layer deposited according to the invention is generally non-opaque (transparent or translucent) and has in particular a light transmission of at least 12% and that may range in particular up to 85%. This light transmission is measured according to the standard ISO 9050:2003 using the illuminant D65, for the layer deposited on a 4-mm thick transparent glass-ceramic plate with a light transmission $T_L$ of greater than 80% that has the following composition (by weight): $SiO_2$: 67.4%, $Al_2O_3$: 20%, $As_2O_3$: less than 1%, BaO less than 1%, $TiO_2$: 2.6%, ZnO: 1.6%, $ZrO_2$: 1.7%, MgO: 1.25%, $Na_2O$: less than 0.5%, $K_2O$: less than 0.5%, $Li_2O$: 3.45% and $Fe_2O_3$: less than 0.1%, the light transmission being measured with the aid of a spectrophotometer sold by the company Perkin Elmer under the reference Lambda 900.

The adhesion of the deposited ink layer is good, without even requiring firing and without requiring pre-treatment of the support and/or the use of an adhesion promoter, a tie layer or a primer.

In order to solidify, the ink deposited according to the invention may be dried at ambient temperature (in particular by leaving the substrate coated with the ink to dry in the open air), however the high printing speeds and the nature of the support often imposing a forced drying, in particular by heat treatment (for example between 100° C. and 200° C.). Advantageously, the ink deposited according to the invention does not require high-temperature firing before coating with the second type of layer.

In accordance with the invention, the ink layer, after deposition and optional drying, is coated with at least one layer of silicone-based paint, this layer of paint advantageously being deposited by screen printing.

The term paint makes it possible in particular to make a distinction relative to the term ink used for the first layer, in particular in terms of composition (the paint, in particular, generally including inorganic fillers, unlike the ink where such fillers are present less or are absent, and the ink used according to the invention including nanoscale pigments, etc.), viscosity (the paint having a higher viscosity than that of the ink) and mode of deposition (the paint being deposited in particular in the form of a flat tint, in particular by screen printing, spraying, roll coating or curtain coating, unlike the ink deposited by inkjet printing according to the invention, the deposited thicknesses additionally being different).

Preferably, as indicated above, although the first layer is preferentially non-opaque (transparent or translucent), the second layer is on the other hand preferentially opacifying, in particular it reduces the light transmission of the previous layer. The layer of paint deposited according to the invention has in particular a light transmission of less than 15%. This light transmission is measured according to the standard ISO 9050:2003 using the illuminant D65, for the layer deposited on a 4-mm thick transparent glass-ceramic plate with a light transmission $T_L$ of greater than 80% that has the following composition (by weight): $SiO_2$: 67.4%, $Al_2O_3$: 20%, $As_2O_3$: less than 1%, BaO: less than 1%, $TiO_2$: 2.6%, ZnO: 1.6%, $ZrO_2$: 1.7%, MgO: 1.25%, $Na_2O$: less than 0.5%, $K_2O$: less than 0.5%, $LiO_2$: 3.45% and $Fe_2O_3$: less than 0.1%, the light transmission being measured with the aid of a spectrophotometer sold by the company Perkin Elmer under the reference Lambda 900.

The layer of paint (or each layer of paint if several layers are deposited, the deposition of a single layer being preferred however), combined with the layer of ink according to the invention, is advantageously chosen so as to withstand high temperatures and to have a stability as regards its color and its cohesion with the plate, and so as not to adversely affect the mechanical properties of the plate. It advantageously has a decomposition temperature of greater than 350° C., in particular between 350° C. and 700° C., and is based, in proportions of at least 15% by weight relative to the solids content of the paint, on silicone resin(s), modified where appropriate by incorporation of at least one radical such as an alkyl, phenyl, etc. radical and/or by incorporation of another resin such as an alkyd resin. The silicone resin or resins of the paint are in particular polysiloxane or silsesquioxane resins, for example having phenyl, and where appropriate crosslinkable, groups, and generally having a weight-average molecular weight (Mw) of between 2000 is and 300 000 Daltons, and for example chosen from polydimethylsiloxanes, polydiphenylsiloxanes, phenylmethylsiloxane polymers, dimethylsiloxane-diphenylsiloxane copolymers, etc., such as the following resins: Dow Corning® 804, 805, 806, 808, 840, 249, 409 HS and 418 HS, Rhodorsil® 6405 and 6406 from Rhodia, Triplus® from General Electric Silicone and SILRES® 604 from Wacker Chemie GmbH, used alone or as a mixture, etc.

The paint may also comprise pigments or colorants, preferably inorganic pigments, in particular based on metal oxides such as chromium oxides, copper oxides, iron oxides, cobalt oxides, nickel oxides, manganese oxides, cerium oxides, titanium oxides, etc., or based on chromates of copper or cobalt, etc., at contents not exceeding 60% by weight relative to the solids content (or in the final layer). As pigments, use may also be made of particles of one or more metals such as aluminum, copper, iron, etc., or alloys based on at least one of these metals, or coated mica platelets (for example coated with $TiO_2$ or $SiO_2$). Preferably, the paint comprises white pigments (for example of $TiO_2$), or optionally black pigments (for example formed of a mixture of iron, chromium, cobalt and nickel oxides (Co—Cr—Fe—Ni spinels, as sold in particular by the company Ferro under the reference 240137), or those formed of a mixture of chromium and copper oxides (Cr—Cu spinels), or based on $MnO_2$, $Fe_2O_3$ and/or CoO, or else pigments based on graphite or carbon black, etc.).

The paint, in its ready-to-deposit form, also generally comprises a medium allowing adjustment to the viscosity desired for application to the substrate and enabling where appropriate binding with the substrate. This medium, generally being consumed at the latest during the firing of the paint, may in particular comprise solvents, diluents, oils, petroleum fractions, film-forming substances, etc. The proportion of medium in the ready-to-deposit composition is preferably between 20% and 60% by weight of said composition.

The paint also comprises, in most cases, one or more mineral fillers (other than pigments and that do not melt in particular during the firing unlike frits, and having for example a reinforcing role or also participating in the thermal resistance of the assembly, for example fillers formed of calcium carbonates, kaolin, etc.), at contents generally of at least 5% by weight and that preferentially do not exceed 40% by weight (relative to the solids content or in the final layer) in order to ensure the cohesion thereof or the mechanical strengthening thereof.

The composition before deposition is generally in the form of a stable liquid-solid mixture, of pasty consistency and having a viscosity suitable for the deposition process (in particular by screen printing), the viscosity during the deposition of the paint preferentially being between 100 and 10 000 mPa·s.

The thickness of the final layer (after firing) of paint (or of each layer of paint where appropriate) may in particular be between 1 and 50 microns, for example between 10 and 30 μm, it being possible for the application of the paint to be carried out by any appropriate and rapid technique that makes it possible in particular to form flat tints, such as brush deposition, doctor blade deposition, spraying, electrostatic deposition, dip coating, curtain coating, screen printing, spray deposition, etc., the application preferably taking place by screen printing, in particular and advantageously over a large surface of the face where the first layer is found (the layer of paint generally and preferably covering at least 90%, or even the whole, of the lower face, it being possible for certain zones, for example display zones, where appropriate to remain uncoated by the layer of paint, or even to bear another localized coating, in the form for example of a semitransparent organometallic layer), this application being followed where appropriate by drying, the substrate coated with the layer of ink and with the paint then generally being heat-treated at a temperature for example between 80° C. and 500° C. after the deposition of the paint in order to perform the firing/crosslinking of the paint and the elimination where appropriate of the residues of possible solvents.

The coated article has a good thermal resistance compatible with the use of various types of heating, does not pose any maintenance, scratching or abrasion problems, it has a good resistance to heat shocks and to aging and also a sufficient mechanical strength. From the point of view of the process, the compositions deposited are compatible with the existing production lines.

As already mentioned, the present invention also relates to the process for manufacturing articles according to the invention, as defined above, the coatings being deposited successively on the glass-ceramic substrate or support (in particular glass-ceramic substrate or support, obtained previously by ceramization, or substrate or support made of another glass material having a CTE of less than $50 \times 10^{-7}$ $K^{-1}$ between 20° C. and 300° C.) by advantageously carrying out a simple drying (in the open air or accelerated by heat treatment in particular) between the two depositions, the substrate coated with the two types of coatings then generally being fired.

As a reminder, the manufacture of glass-ceramic plates is generally carried out as follows: the glass, having a composition chosen for forming the glass-ceramic, is melted in a melting furnace, the molten glass is then rolled into a standard ribbon or sheet by making the molten glass pass between rolling rollers, and the glass ribbon is cut to the desired dimensions. The plates thus cut are then ceramized in a manner known per se, the ceramization consisting in firing the plates with the thermal profile chosen to convert the glass into the polycrystalline material called "glass-ceramic", the coefficient of expansion of which is zero or almost zero and which is resistant to a heat shock possibly ranging up to 700° C. The ceramization generally comprises a step of progressively raising the temperature up to the nucleation range, generally located in proximity to the glass conversion range, a step of passing through the nucleation range over several minutes, a further progressive rise in the temperature up to the ceramization hold temperature, the ceramization hold temperature being maintained for several minutes, followed by rapid cooling down to ambient temperature.

In the case of a glass material other than glass-ceramic, the plate may be manufactured for example by a float process or a rolling process and for example by thermal or chemical tempering in order to obtain the glass material having a CTE of less than $50 \times 10^{-7}$ $K^{-1}$ between 20° C. and 300° C.

Where appropriate, the process also includes a cutting operation (generally before ceramization for the glass-ceramic), for example using a water jet, mechanical scoring using a scoring wheel, etc., followed by a shaping operation (grinding, beveling, etc.).

The firing of the substrate equipped with the two types of coatings being carried out separately from the ceramization operation of the substrate (it is then referred to as a process with refiring or subsequent firing), this firing can in particular be carried out at an appropriate temperature for the firing of the paint, this temperature range lying in particular between 80° C. and 500° C. for the present invention.

As indicated above, after deposition of each type of layer, the coated article is generally dried (for example via infrared heating or in an oven), in particular between 100° C. and 200° C., whether it is the drying of the ink layer or the drying of the paint layer, so as to at least partly evaporate the solvent or medium present where appropriate, to fix the coating and to enable the handling of the article, resulting in an at least partially dried coating.

The thickness of all of the deposited layers/of the final coating obtained (after firing) is generally between 2 and 50 µm, in particular between 5 and 40 µm, or even between 10 and 30 µm. Preferably, the coated substrate has a light transmission $T_L$ (measured according to the standard ISO 9050:2003 using the illuminant D65, the measurement at a given thickness then being converted where appropriate to the reference thickness of 4 mm according to the standard ISO 9050:2003, this total transmission, integrated into the visible range, taking into account the direct transmission and the possible diffuse transmission) of less than 15% over the entire coated surface (certain zones, such as the displays, possibly not being coated with the coating according to the invention, in order for example to retain a certain transparency, or possibly only being provided with one of the layers described such as the layer of paint, or even being provided with another coating).

Where appropriate, the substrate may comprise one or more additional coatings, in particular localized coatings (for example an enamel on the upper face in order to form simple designs or logos). The article according to the invention may also comprise, besides the substrate provided with the preceding coatings, additional elements, for example the substrate may be provided with (or combined with) additional functional or decorative element(s) (frame, connector(s), cable(s), control element(s), display(s), for example "7-segment" light-emitting diode displays or liquid-crystal displays, touch-sensitive electronic control panels with digital displays, etc.), in particular when the substrate is a plate intended to be used as a cooktop. The substrate or article may also be mounted on an appliance, inside which one or more heating elements are placed, without it being necessary to insert an intermediate element that aims to mask the interior of the appliance from the user's view. The invention thus relates to all appliances (or devices) for cooking and/or for maintaining at high temperature that include at least one coated substrate according to the invention (for example in the form of a plate or door), for example cookers, integrated cooking surfaces, ovens, etc. The invention also covers both cooking appliances having a single plate and appliances having several plates, each of these plates having, where appropriate, a single heater or is multiple heaters. The term "heater" is understood to mean a cooking location. The invention also relates to hybrid cooking appliances, the cooktop(s) of which has (have) several types of heater. Furthermore, the invention is not limited to the manufacture of cooktops for cookers or cooking surfaces. The articles according to the invention may also be, as specified above, other articles (fireplace inserts, fire screen, etc.) that have in particular to be very insensitive to temperature variations.

The examples that follow illustrate the results obtained with glass-ceramic articles according to present invention, in comparison with reference examples.

Comparative Example 1

Use is made of a 4-mm thick smooth/smooth transparent mother glass plate having a light transmission of more than 80%, using a glass having a composition according to application FR2657079. This glass is melted at around 1600-1750° C., in an amount such that a ribbon of glass can be rolled, cut from which ribbon are glass plates, having final dimensions of 50 cm×60 cm×0.4 cm.

The selected decoration, of photographic type, having a thickness of the order of several μm (giving a thickness of 3 μm after drying), is printed by inkjet printing on the lower face of the glass-ceramic using a Fujifilm Dimatix Materials Printer DMP-2800 printer from the company Fujifilm and using a ceramic ink based on a glass frit containing bismuth sold by the company Dip Tech under the reference white ceramic ink.

The ink layer is then fired during the process for ceramization (according to a cycle as described in patent application FR2657079) of the plate. A weakening of the plate is observed, the flexural strength (or scale factor) measured when the coated face is placed in extension being less than 70 MPa (the flexural strength measured for the uncoated substrate being greater than 150 MPa). The flexural strength (or scale factor) is measured using a ring-on-tripod flexural test, on a sample having dimensions of the order of 7 cm×7 cm×0.4 cm. The sample rests on 3 balls having a diameter of 9.5 mm which are positioned at the top of an equilateral triangle inscribed in a 40-mm diameter circle. A force is applied at the center of the sample with a 10-mm diameter ring, with a speed of the order of 5 mm/min. The results are interpreted with the aid of the Weibull model described in the article "A statistical distribution of strength of materials, Royal Swedish Institute For Engineering Research, W. Weibull, Stockholm 1939, 1-45", the data obtained, indicator of the mean flexural strength, being referred to as scale factor.

Use is made, for each of the following examples, of a smooth/smooth transparent glass-ceramic plate sold under the reference Keralite by the company Eurokéra, having a thickness of 4 mm and having a light transmission $T_L$ of more than 80% (and generally obtained by ceramization from a glass having a composition according to application FR2657079 or according to application WO2013171288) and the same type of photographic decoration as in comparative example 1 is printed.

Comparative Example 2

The selected decoration, having a thickness of the order of 2 μm (thickness after drying), is printed by inkjet printing on the lower face of the glass-ceramic using an Anapurna printer from the company Agfa-Gevaert (it being possible for the use of a printer other than the one used in the previous example to possibly have an effect on the definition of the image but not influencing the properties of the layer obtained) and using a UV-curable acrylic ink sold by the company Agfa under the reference Anapurna M.

A flat tint of paint is then produced by screen printing (using customary polyester or polyamide mesh cloths) on the entire lower face of the plate (and on the first layer of ink deposited), having a thickness of the order of 20 μm (giving a thickness of the order of 10 μm after drying), with the aid of a white paint formed of 29% by weight of epoxy binder sold by the company Biesterfeld Helevtia under the reference Epilink DP 660, 8.5% by weight of pigments sold by the company Kronos under the reference Kronos 2310, 18% of barium sulfate, 12% of talc, 4% of fillers sold by the company Deuteron under the reference Deuteron MK, 1% of wetting agent sold by the company Air Products under the reference Surfynol 420, 2% of defoamer sold by the company Evonik under the reference Foamex 815N, the remainder being formed by demineralized water, this base additionally having been mixed with an amine binder sold by the company Air Products under the reference Epires ER8 in a proportion of 10 parts of base per 3 parts of amine binder in order to form the paint.

The coated plate is then fired at around 450° C. for 1 h.

A delamination of the ink layer, and also a browning of the colors, are observed after firing.

The same observations are also made when the glass-ceramic is precoated (before deposition of the ink layer) by wiping it with a layer of an aminosilane-based primer sold under the reference Hydropep 100 by the company Sika France.

Comparative Example 3

The selected decoration, having a thickness of the order of 2 μm (thickness after drying), is printed by inkjet printing on the lower face of the glass-ceramic using a Practika printer from the company MuchColours and using an ink with nanoscale pigments and silicone binder that is free of glass frit sold by the company MuchColours under the reference Nanocolours ink jet.

The plate coated with the single layer of ink is then dried in the open air for 24 h.

A crumbling of the ink layer is observed after aging in an oven at 200° C. for 500 h. Furthermore, the coated substrate has a light transmission $T_L$ of greater than 50% in certain zones, the coating not being sufficient to mask the optional heating elements placed under the plate.

Example According to the Invention

The selected decoration, having a thickness of the order of 2 μm (thickness after drying), is printed by inkjet printing on the lower face of the glass-ceramic using a Practika printer from the company MuchColours and using the ink with nanoscale pigments and silicone binder that is free of glass frit sold by the company MuchColours under the reference Nanocolours ink jet Black, the silicone binder being formed of poly(methylphenylsiloxane) and the pigments being carbon black pigments, the ink further comprising ethanol (solvent).

The plate coated with the single layer of ink is then dried in the open air for 24 h.

A flat tint of paint is then produced by screen printing (using customary polyester or polyamide mesh cloths) on the entire lower face of the plate (and on the first layer of ink deposited), having a thickness of the order of 20 μm (giving a thickness of 10 μm after firing), with the aid of a white silicone-based paint formed of a polymethylsilsesquioxane resin powder (37.5 g) sold by the company Wacker under the reference Belsil PMS—MK, and dissolved, at a proportion of 50% by weight, in terpineol (solvent) in order to obtain a silicone base; white pigments sold by the company Kemira under the reference Kemira 300 (10 g), a silicone oil sold by the company Sigma Aldrich under the reference Silicone Oil (1.5 g) and butanol (cosolvent, 4.5 g) also being added to this silicone base.

The coated plate is then fired at around 450° C. for 1 h. The thickness of the final coating after firing is of the order of 12 μm.

After firing, it appears that the designs have retained their original color, that the substrate has not been mechanically weakened (the flexural strength measured being of the order of that of the uncoated substrate, i.e. greater than 150 MPa, when the coated face is placed in extension), that no delamination has occurred, the coated substrate further having a light transmission $T_L$ of less than 15% over its entire surface making it possible in particular to mask the optional heating elements placed under the plate.

An aging test is also carried out in an oven at 200° C. for 500 h. At the end of this test, no visible discoloration or delamination is noted either.

Thermal tests are additionally carried out by placing a resistive heater on the upper face in order to simulate an empty saucepan, the resistance being brought firstly to 360° C. for 90 min then secondly to 560° C. for 10 min. Once again, at the end of this test, no visible discoloration is noted, and likewise no deformation or optical effect.

The same observations are also made when the paint is replaced by a black silicone-based paint formed of a polymethylsilsesquioxane resin powder (37.5 g) sold by the company Wacker under the reference Belsil PMS - MK, and dissolved, at a proportion of 50% by weight, in terpineol (solvent) in order to obtain a silicone base; black pigments (based on coated mica platelets) sold by the company Ciba under the reference Xymara Satin Black Pearl (15 g), a silicone oil sold by the company Sigma Aldrich under the reference Silicone Oil (1.5 g) and butanol (cosolvent, 4.5 g) also being added to this silicone base.

It should be noted that the use of one or the other preceding layer (of ink or paint) alone does not make it possible to obtain such properties, the use of the ink alone in particular posing problems of delamination and of insufficient opacity and the use of the paint alone not making it possible in particular to obtain the desired decorations.

The articles according to the invention may in particular be used advantageously for producing a new range of cooktops for cookers or cooking surfaces, but they can also be used advantageously for producing elements of a wall or walls (for example doors) of ovens, or for producing fireplace inserts or fire screens, etc.

The invention claimed is:

1. A glass article comprising:
    at least one substrate made of glass material, said substrate being at least partly coated with at least one layer of ink, the ink being formed of nanoscale pigments and of at least one silicone binder, said layer of ink being coated with at least one layer of silicone-based paint,
    wherein the layer of ink is non-opaque,
    wherein the layer of paint is opacifying, and
    wherein the silicone binder(s) represent from 50% to 95% by weight of the ink.

2. The article as claimed in claim 1, wherein the ink is free of glass frit.

3. The article as claimed in claim 1, wherein the coated substrate has a light transmission $T_L$ of less than 15% on its coated surface.

4. The article as claimed in claim 1, wherein the coating formed of the two layers is on a lower or inner face of the substrate.

5. The article as claimed in claim 1, wherein the substrate is formed of a glass material having a CTE of less than $50 \times 10^{-7}$ $K^{-1}$ between 20° C. and 300° C., said material being a glass-ceramic, having a CTE of less than $30 \times 10^{-7}$ $K^{-1}$, or being another glass material having a CTE of less than $50 \times 10^{-7}$ $K^{-1}$ between 20° C. and 300° C.

6. The article as claimed in claim 1, wherein the substrate is formed of a transparent glass-ceramic.

7. The article as claimed in claim 1, wherein the paint has a decomposition temperature above 350° C., and is based, in proportions of at least 15% by weight, on silicone resin(s).

8. The article as claimed in claim 1, characterized in that wherein the ink comprises, as pigments, black pigments.

9. The article as claimed in claim 1, further comprising one or more heating elements.

10. The article as claimed in claim 1, wherein the glass is a glass ceramic.

11. The article as claimed in claim 1, wherein the at least one substrate is a plate.

12. The article as claimed in claim 11, wherein the plate is made of a glass ceramic.

13. The article as claimed in claim 1, wherein the layer of ink is deposited by inkjet printing.

14. The article as claimed in claim 1, wherein the layer of paint is deposited in the form of a flat tint.

15. The article as claimed in claim 1, wherein the layer of paint is deposited by screen printing.

16. The article as claimed in claim 1, wherein the layer of ink has a light transmission $T_L$ of at least 12%, and the layer of paint has a light transmission $T_L$ of less than 15%.

17. The article as claimed in claim 1, wherein the nanoscale pigments represent from 5% to 50% by weight in the ink.

18. A process for manufacturing a glass article formed of at least one glass substrate, the process comprising:
    applying at least one layer of ink formed of nanoscale pigments and of at least one silicone binder on at least one portion of said substrate, and
    applying at least one layer of silicone-based paint on said layer of ink,
    wherein the layer of ink is non-opaque,
    wherein the layer of paint is opacifying, and
    wherein the silicone binder(s) represent from 50% to 95% by weight of the ink.

19. The process as claimed in claim 18, wherein the layer of paint covers at least 90% of a lower face of the substrate.

20. The process as claimed in claim 18, wherein the layer of ink is applied by inkjet printing and the layer of paint is applied by screen printing.

* * * * *